United States Patent
Monk et al.

(10) Patent No.: US 10,122,599 B2
(45) Date of Patent: Nov. 6, 2018

(54) METHOD AND APPARATUS FOR DYNAMICALLY SCALING APPLICATION PERFORMANCE ANALYSIS COMPLETENESS BASED ON AVAILABLE SYSTEM RESOURCES

(71) Applicant: Fluke Corporation, Everett, WA (US)

(72) Inventors: John Monk, Monument, CO (US); Dan Prescott, Elbert, CO (US); Robert Vogt, Colorado Springs, CO (US); Bruce Kosbab, Colorado Springs, CO (US)

(73) Assignee: AIRMAGNET, INC., Westford, MA (US)

( * ) Notice: Subject to any disclaimer, the term of this patent is extended or adjusted under 35 U.S.C. 154(b) by 1256 days.

(21) Appl. No.: 13/655,451

(22) Filed: Oct. 19, 2012

(65) Prior Publication Data
US 2014/0115145 A1    Apr. 24, 2014

(51) Int. Cl.
G06F 15/173 (2006.01)
H04L 12/26 (2006.01)
G06F 11/34 (2006.01)

(52) U.S. Cl.
CPC .......... *H04L 43/04* (2013.01); *G06F 11/3419* (2013.01); *G06F 11/3495* (2013.01); *H04L 43/12* (2013.01); *G06F 2201/81* (2013.01); *G06F 2201/875* (2013.01)

(58) Field of Classification Search
CPC ..... H04L 1/1867; H04L 47/12; H04L 47/193; H04L 47/11
USPC ........................................................ 709/224
See application file for complete search history.

(56) References Cited

U.S. PATENT DOCUMENTS

| | | | |
|---|---|---|---|
| 7,543,052 B1 | 6/2009 | Cesa Klein | |
| 7,613,126 B1 | 11/2009 | Natarajan et al. | |
| 7,822,837 B1 * | 10/2010 | Urban | H04L 41/5009 709/223 |
| 8,630,204 B1 * | 1/2014 | Williams | H04L 69/168 370/253 |
| 2003/0214954 A1 * | 11/2003 | Oldak et al. | 370/400 |
| 2005/0165948 A1 | 7/2005 | Hatime | |
| 2010/0027432 A1 * | 2/2010 | Gopalan | H04L 41/142 370/252 |
| 2011/0083179 A1 * | 4/2011 | Lawson | H04L 63/1458 726/22 |
| 2012/0008499 A1 | 1/2012 | Stanwood et al. | |
| 2012/0275323 A1 * | 11/2012 | Reznik | H04L 47/10 370/252 |

OTHER PUBLICATIONS

International Search Report and Written Opinion for PCT/US2013/065902, dated Feb. 10, 2014.

* cited by examiner

*Primary Examiner* — Kevin Bates
*Assistant Examiner* — Emad Siddiqi
(74) *Attorney, Agent, or Firm* — Locke Lord LLP; Scott D. Wofsy; Christopher J. Capelli

(57) ABSTRACT

A method and apparatus is disclosed herein for dynamically scaling application performance analysis completeness based on available system resources. In one embodiment, the method comprises monitoring incoming network traffic and a rate at which the traffic is being analyzed and dynamically adjusting application performance analysis completeness, the analysis being performed on the observed network traffic.

16 Claims, 5 Drawing Sheets

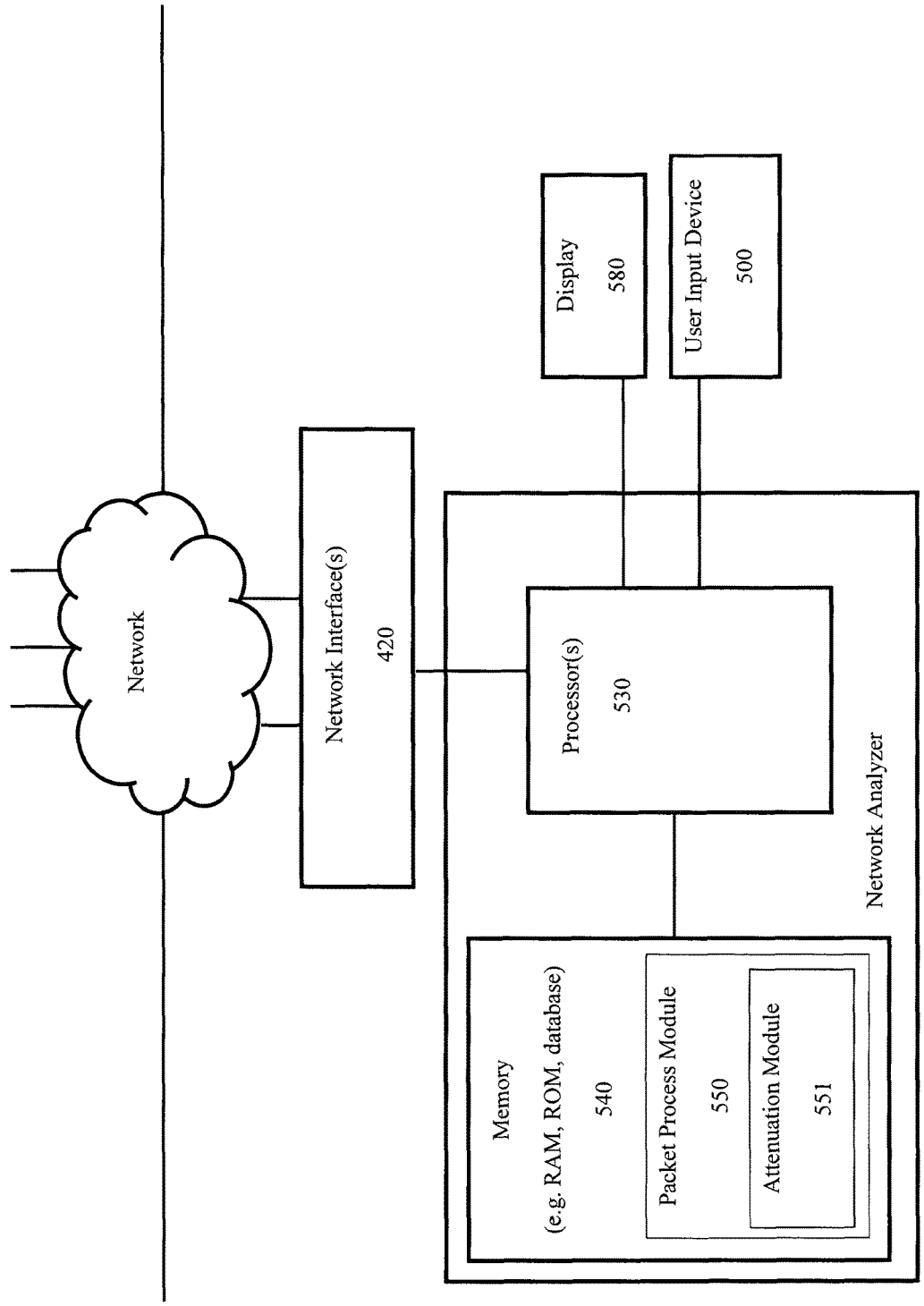

METHOD AND APPARATUS FOR DYNAMICALLY SCALING APPLICATION PERFORMANCE ANALYSIS COMPLETENESS BASED ON AVAILABLE SYSTEM RESOURCES

FIELD OF THE INVENTION

Embodiments of the present invention relate to networking analysis, and more particularly to dynamically scaling the amount of analysis that is performed on the network traffic.

BACKGROUND OF THE INVENTION

Networks can include multiple network devices such as routers, switches, hubs, servers, client computers (e.g., desktop PCs, laptops, workstations), and peripheral devices networked together across a local area network (LAN) and/or a wide area network (WAN). In such networks, data is typically exchanged between a requesting device, such as a client, and a responding device, such as a server. These data exchanges may involve large amounts of traffic.

Today, network technicians may want to analyze network traffic. Because the computer networking environments are very complex and the amount of data exchanged is very large, the network technician may be interested in analyzing only selected traffic between clients and servers, and in particular situations only between specific client/server sets. Such analysis is often done using network monitoring and analyzing devices that are positioned in the network near the client and the server. Using the monitoring device, the network traffic may be observed and a determination may be made as to the client, the server and the protocol, and if the observed traffic is of the desired type and represents client/server traffic within a group of interest to the technician, the traffic or information about the traffic is passed on for further processing or analysis.

Network technicians often want to analyze network traffic to determine where application bottlenecks are occurring. For example, a network technician may want to locate the cause of a slow down in the performance of an application, such as a browser, by monitoring the traffic and determining the time associated with each the client, network and server to complete certain transactions. Such information may enable the technician to isolate where the slow down is occurring and thus be able to take a more informed approach to fixing the problem.

One problem with analyzing network traffic is that network conditions can change and cause an excessive amount of network data to be transmitted. When the network data rate is increased and causes excessive network data rates, an application performance monitoring system can be forced to perform incomplete comprehensive analysis because there are data gaps for seemingly arbitrary periods of time. Data gaps refers to missing data (e.g., stats, analysis, etc.). Thus, the resulting network traffic analysis could produce incorrect results because all the data is analyzed in time without causing delay in the transport of the network data traffic.

SUMMARY OF THE INVENTION

A method and apparatus is disclosed herein for dynamically scaling application performance analysis completeness based on available system resources. In one embodiment, the method comprises monitoring incoming network traffic and a rate at which the traffic is being analyzed and dynamically adjusting application performance analysis completeness, the analysis being performed on the observed network traffic.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is one embodiment of a block diagram of a network monitoring device.

DETAILED DESCRIPTION OF THE PRESENT INVENTION

Figure 1:
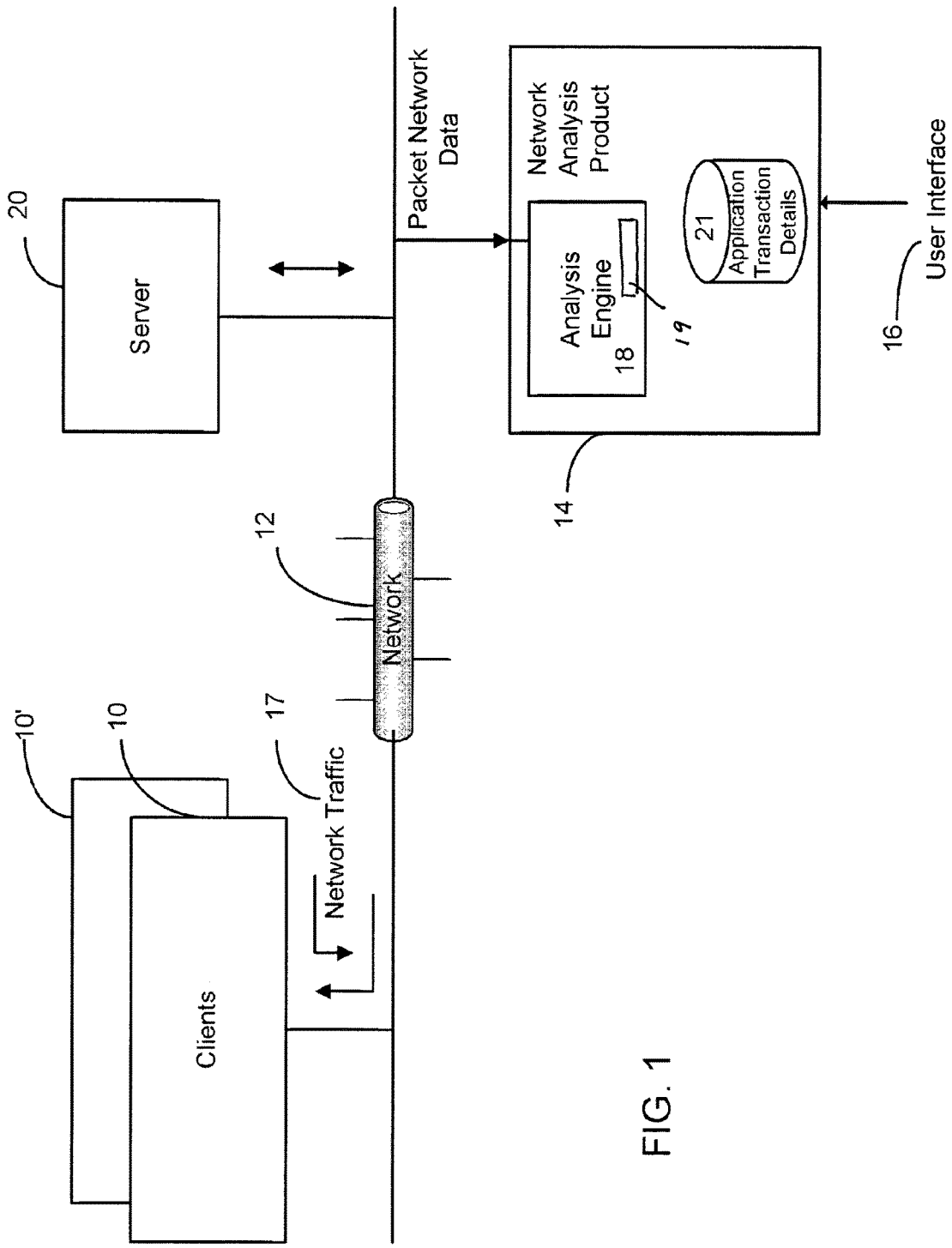
FIG. 1 is block diagram of one embodiment of a network.

FIG. 1 is block diagram of a network with an apparatus in accordance with the disclosure herein. In one embodiment, the network comprises plural network devices 10, 10' which are denoted clients, which communicate over a network 12 by sending and receiving network traffic 17. Some of the traffic is between clients 10, 10' and server 20. The traffic may be sent in packet form, with varying protocols and formatting thereof.

A network analysis product 14 is also communicably coupled to the network. In one embodiment, network analysis product 14 includes a user interface 16 that enables a user to interact with the network analysis product to operate the analysis product and obtain data therefrom, whether at the location of installation or remotely from the physical location of the analysis product network attachment.

Network analysis product 14 comprises hardware and software, a central processing unit (CPU), memory, interfaces and the like to operate to connect to and monitor traffic on the network, as well as performing various testing and measurement operations, transmitting and receiving data and the like. When remote, network analysis product 14 typically is operated by running on a computer or workstation interfaced with the network.

In one embodiment, network analysis product 14 operates as a network application performance monitoring system to monitor network application performance. In one embodiment, network analysis product 14 comprises an analysis engine 18 which receives the packet network data and interfaces with application transaction details data store 21. In one embodiment, analysis engine 18 includes an attenuation unit 19 to control the amount of network application performance monitoring that is performed by analysis engine 18. In one embodiment, attenuation unit 19 dynamically scales the completeness of the network application performance monitoring. That is, at times, attenuation unit 19 dynamically scales the completeness of the network application performance monitoring so that the amount of network application performance monitoring is decreased, while at other times attenuation unit 19 dynamically scales the completeness of the network application performance monitoring so that the amount of network application performance monitoring is increased.

In one embodiment, attenuation unit 19 dynamically adjusts the completeness of application performance when the traffic rates exceed the system's ability to fully analyze the traffic. By dynamically adjusting the amount of application performance analysis, attenuation unit 19 helps ensure that traffic analysis takes place at a level of completeness that is appropriate for the given network conditions and solves the problem of allowing excessive network data rates to force an application performance monitoring system to perform incomplete comprehensive analysis. This dynamic scaling of analysis effectively governs the amount of work that the monitoring system needs to accomplish given the current network conditions.

Figure 2:
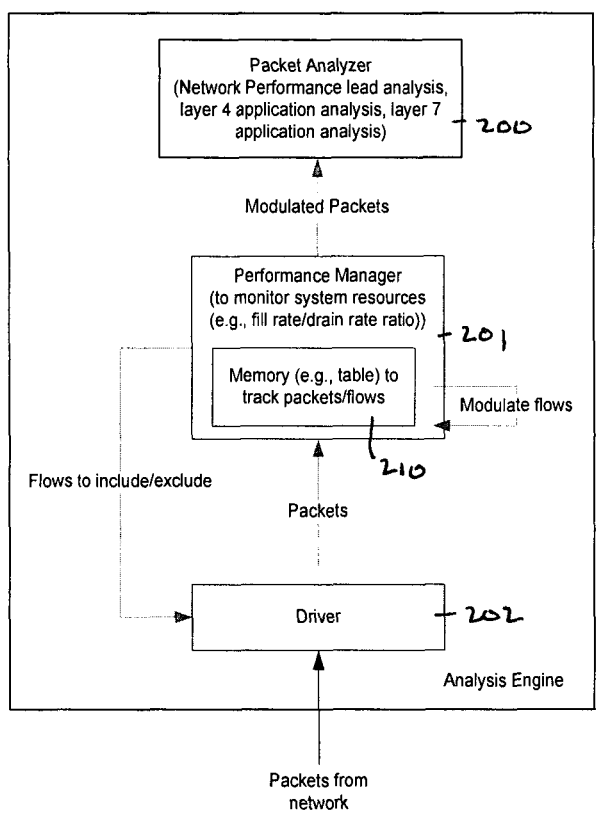
FIG. 2 is a block diagram of one embodiment of an analysis engine.

FIG. 2 is a block diagram of one embodiment of an analysis engine. The analysis engine is communicably coupled to the network and observes transmissions on the network to collect information and statistics thereon related to client/server traffic. Thus, the analysis engine in conjunction with remainder of the network analysis product acts as an application performance monitoring system.

In one embodiment, the analysis engine uses a set of filters based on IP addresses and/or ports, suitably ranges of IP addresses and/or ranges of ports, to select traffic that is within those IP ranges and/or port ranges for analysis. Accordingly, a vast amount of traffic is observed, but information and statistical results are only desired where it is know that the traffic is client/server and only where the client and/or server is/are part of the client/server set in which the user (e.g., IT administrator) is interested.

As discussed above, the analysis engine dynamically adjusts the completeness of application performance analysis performed on observed network traffic at specific times. In one embodiment, analysis engine is a multi threaded, pipelined collection of acquisition, analysis and storage elements.

Referring to FIG. 2, in one embodiment, the analysis engine includes a performance manager 201 (e.g., a software agent) that receives packets from a driver 202 that have been designated for analysis and provides packets to a packet analyzer 200, which performs one or more different levels of analysis as discussed herein. In one embodiment, packet analyzer 200 performs layer 7 application analysis (for example, on HTTP or database traffic such as, for example, decoding vendor specific database traffic (e.g., MySQL) into complete SQL request and response strings), layer 4 application analysis (TCP metrics such as, for example, zero orders, resets, out-of-orders, UDP metrics), and network performance level analysis (for example, determining packet and octet/byte counts allocated to specific applications). In other embodiments, other types of analysis that the analysis engine performs includes HTTP, CIFS/Netbios, DNS, MySQL, Oracle, SQL-Server, Citrix, VoIP. The results of the analysis can be used to be used to determine client response time, server response time, and/or other well-known application performance statistics.

In one embodiment, performance manager 201 monitors the incoming network traffic rates and the rate at which the traffic is being analyzed and computes the amount of time that analysis can continue at its current settings without dropping incoming packets. For purposed herein, this amount of time is referred to as time to failure (TTF). In one embodiment, if the TTF value drops below a certain threshold (e.g., 10 msec, based on the incoming packet buffer capacity and the incoming packet rate), performance manager 201 causes the completeness of application performance analysis that is performed by the analysis engine to be decreased. In one embodiment, decreasing the completeness of application performance analysis means that instead of performing layer 7 application analysis, layer 4 application analysis, and network performance level analysis, only layer 4 application analysis and network performance level analysis are performed. In one embodiment, in the most demanding network situations, decreasing the completeness of application performance analysis means that only network performance level analysis is performed.

In one embodiment, performance manager 201 repeats the process of computing the TTF value (e.g., every 10 msecs) and dynamic scaling until the monitoring system reaches a stable state where the current level of analysis can be maintained indefinitely without the system dropping incoming packets. Conversely, if performance manager 201 detects that it is running under its maximum capacity and the level of analysis is not at the maximum level, performance manager 201 increases the level of analysis and reassess the stability of the monitoring system.

In one embodiment, performance manager 201 dynamically scales the completeness of application performance analysis by adjusting the flow sampling either up or down according to the incoming packet buffer capacity by using the instantaneous ratio of fill/drain rate of the incoming packet buffer. In one embodiment, performance manager 2012 continually monitors the hardware buffer's fill/drain rate ratio and instructs the upstream driver 203 to include or exclude more flows of packets as appropriate. Performance manager 201 monitors a memory buffer 210 into which packets are written to determine whether or not downstream analysis is able to "keep up". Using a bathtub analogy, driver 202 (and the acquisition hardware, such as the network interface) is continually filling the tub, and the downstream packet analyzer 200 (e.g., analysis software) is draining the tub. Note that although memory buffer 210 is shown as part of performance manager 201, in one embodiment, memory buffer 210 is a separate entity that is monitored by performance manager 201 to determine the drain rate to packet analyzer 200.

In one embodiment, the applications for which performance is being monitored are divided up into two groups: critical and non-critical applications. The designations of which applications are critical and which are non-critical is set up during system configuration or in an alternative embodiment may be set dynamically while the system is running. In one embodiment, the scaling (throttling) of application performance analysis for each application is performed according whether the application is a critical application or non-critical application. Initially, when scaling of application performance analysis occurs, application performance analysis is reduced for non-critical applications first and then for critical applications. For example, when performance manager 201 determines that the instantaneous ratio of fill/drain rate is such that scaling is needed, then the application performance analysis may be reduced (e.g., eliminate layer 7 analysis) for non-critical applications. Thereafter, performance manager 201 checks the ratio again to see whether or not downstream analysis is able to "keep up. If not, performance manager 201 may cause application performance analysis to be further reduced (e.g., eliminate layer 4 analysis) for non-critical applications. Alternatively, at this time, performance manager 201 may cause application performance analysis to be further reduced (e.g., eliminate layer 4 analysis) for non-critical applications and reduced (e.g., eliminate layer 7 analysis) for critical applications. One skilled in the art would recognize that various combinations of reductions, as well as increases, to the application performance analysis for both critical and non-critical applications is possible.

In another embodiment, the scaling (throttling) of application performance analysis for each application is performed according to two different schedules based on whether the application is a critical application or non-critical application. For example, one schedule may control the amount of reduction, or attenuation, of application performance analysis with respect to non-critical applications. For instance, if the instantaneous ratio of fill/drain rate is at 20% of a first threshold, then 20% of the non-critical applications are attenuated (or alternatively 20% of the application performance analysis for the non-critical applications are attenuated); if the instantaneous ratio of fill/drain rate is at 30% of a first threshold, then 30% of the non-critical applications are attenuated (or alternatively 30% of the application performance analysis for the non-critical applications are attenuated); etc. Similarly, if the instantaneous ratio of fill/drain rate is at 20 or 30% of a first threshold, then none of the critical applications are attenuated; if the instantaneous ratio of fill/drain rate is at 40% of a first threshold, then 20% of the critical applications are attenuated (or alternatively 20% of the application performance analysis for the non-critical applications are attenuated); etc. In one embodiment, the attenuation of non-critical or critical applications involves discarding some portion of packets associated with the flows for those applications so that the discarded packets are not analyzed.

In one embodiment, performance manager 201 keeps track of the packets/flows that have been excluded from analysis by packet analyzer 200. Performance manager 201 has an API to provide scaling information to downstream components. In one embodiment, performance manager 201 maintains the following information (excluded traffic metadata) that includes: Flow ID (0); Start Time; End Time; Count; client/server (C/S) byte counts; C/S packet counts; Source (Src) IP; Destination (Dest) IP; Src Port; Dest Port; Site; Application; and Protocol.

Figure 3:
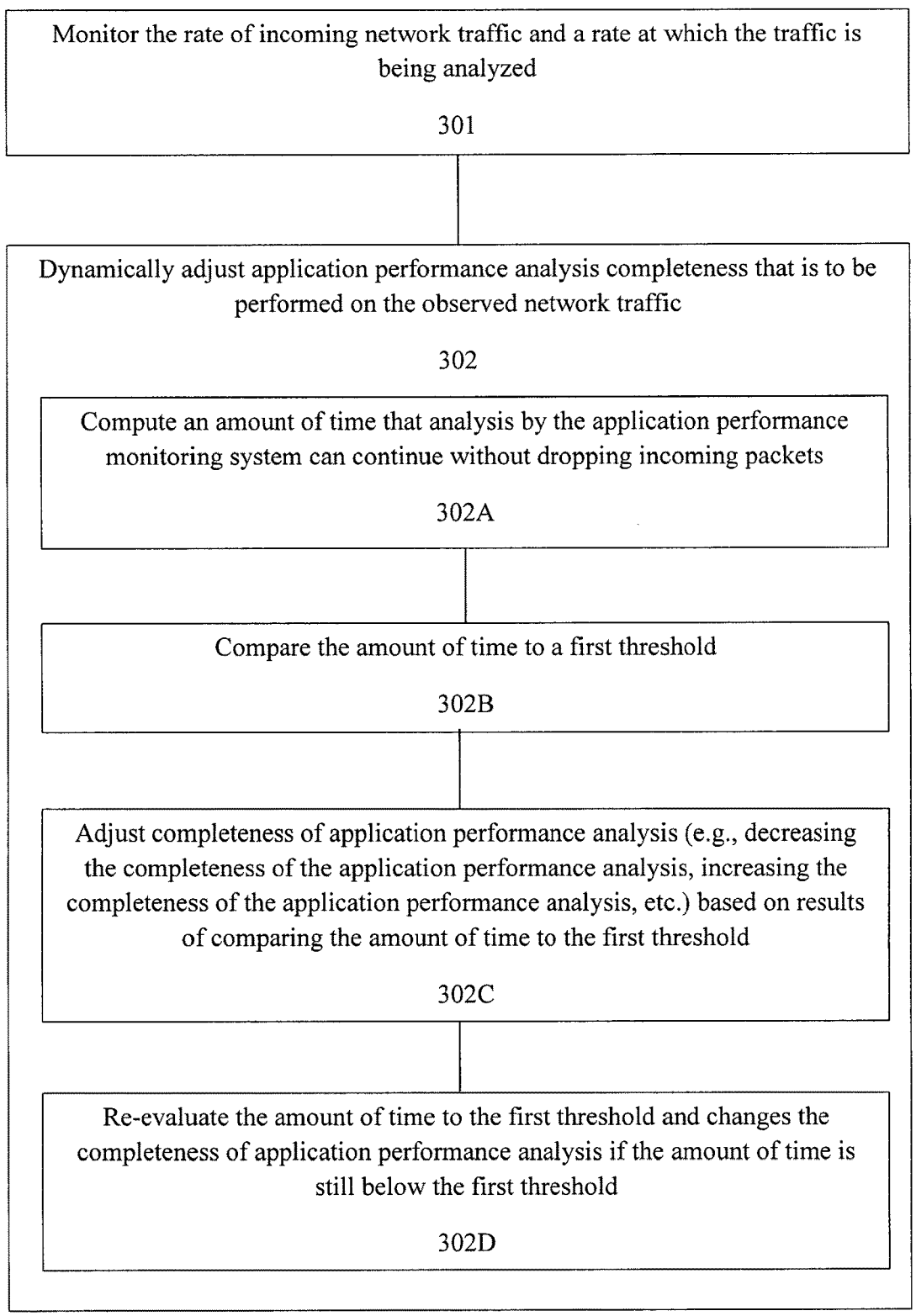
FIG. 3 is a flow diagram of one embodiment of a process for determining whether to attenuate the processing of packets.

FIG. 3 is the flow diagram of one embodiment of a process for determining whether to attenuate the processing of packets. The process may be performed by processing logic that may comprise hardware (circuitry, dedicated logic, etc.), software (such as is run on a general purpose computer system or a dedicated machine), or a combination of both. In one embodiment, the process is performed by a network application performance monitoring system.

Referring to FIG. 3, the process begins by monitoring the rate of incoming network traffic and a rate at which the traffic is being analyzed (processing block 301). In one embodiment, a network application performance monitoring system, such as that which includes the analysis engine of FIG. 1, generates a ratio of the rate at which incoming network traffic is being received versus the rate at which packets are being analyzed and uses the rate to control whether to dynamically adjust the completeness of the application performance analysis being performed. In one embodiment, the monitoring system uses the ratio to control which of the different types of analysis (e.g., network performance analysis, layer 4 analysis, layer 7 analysis, etc.) are performed.

Based on the rate of the incoming network traffic and the rate at which the traffic is being analyzed, processing logic dynamically adjusts application performance analysis completeness that is to be performed on the observed network traffic (processing block 302). In one embodiment, dynamically adjusting application performance analysis completeness comprises computing an amount of time that analysis by the application performance monitoring system can continue without dropping incoming packets (processing block 302A), comparing the amount of time to a first threshold (processing block 302B), and adjusting completeness of application performance analysis (e.g., decreasing the completeness of the application performance analysis, increasing the completeness of the application performance analysis, etc.) based on results of comparing the amount of time to the first threshold (processing block 302C). Thereafter, processing logic re-evaluates the amount of time to the first threshold and changes the completeness of application performance analysis if the amount of time is still below the first threshold (processing block 302D).

In one embodiment, adjusting the completeness of the application performance analysis comprises determining that the amount of time is below the first threshold, and decreasing the completeness of the application performance analysis. In one embodiment, decreasing application performance analysis completeness comprises only performing a subset of the following analyses: network performance level analysis, layer 4 application analysis, and layer 7 application analysis. In one embodiment, decreasing the completeness of the application performance analysis is only performed with respect to the non-critical applications. In one embodiment, the processing logic subsequently re-evaluates the amount of time to the first threshold and changes the completeness of the application performance analysis with respect to one or more critical applications if the amount of time is still below the first threshold.

In one embodiment, decreasing application performance analysis completeness comprises performing only network performance level analysis. In another embodiment, decreasing application performance analysis comprises performing only network performance level analysis and layer 4 application analysis.

In one embodiment, the process also includes increasing application performance analysis completeness if the monitoring system is running under maximum capacity and the monitoring system is not performing all levels of application performance analysis.

Another Embodiment of a Process for Imposing Dynamic Scaling

Figure 4:
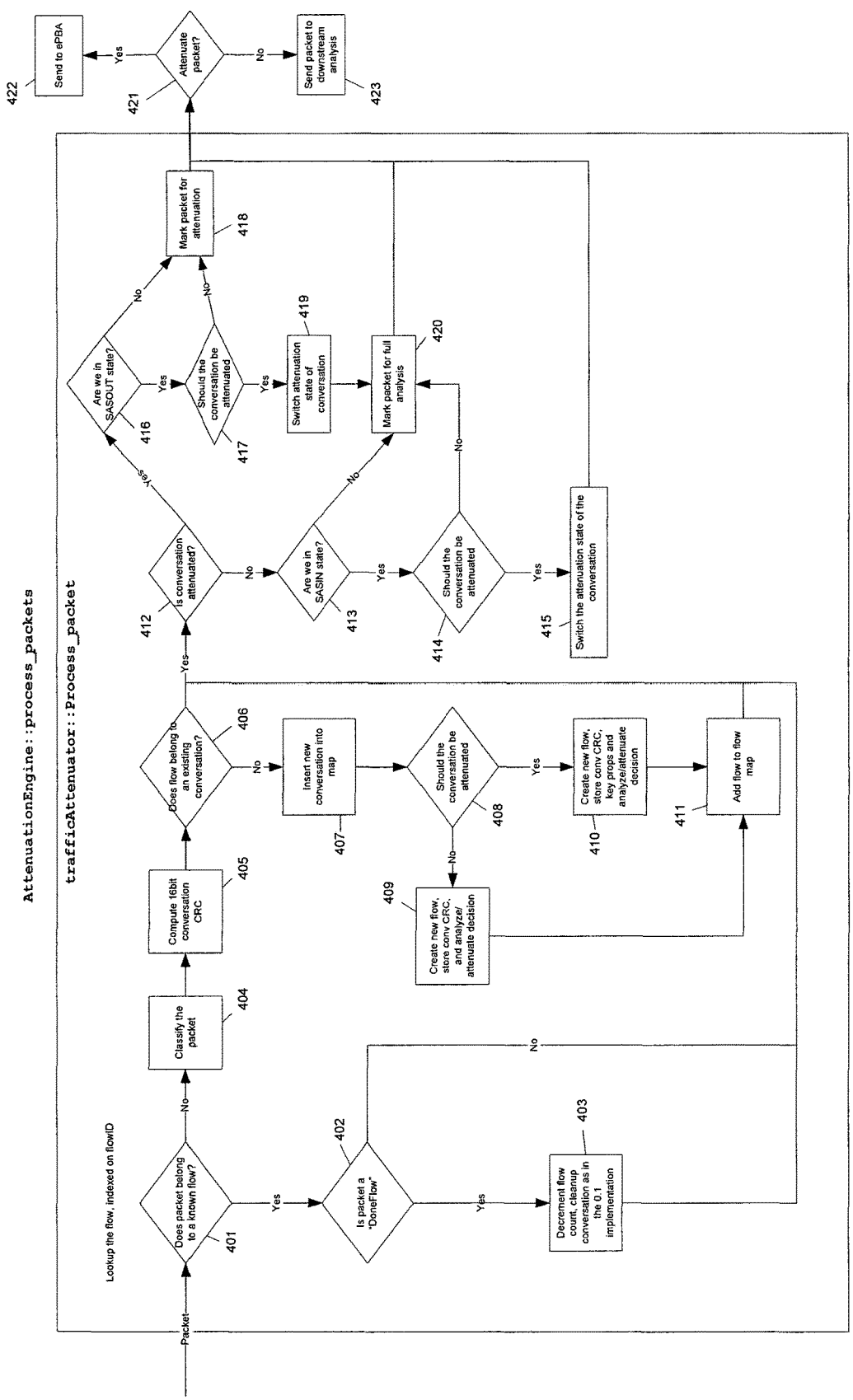
FIG. 4 is a flow diagram of another embodiment of a process for determining whether to attenuate the processing of packets.

FIG. 4 is the flow diagram of one embodiment of a process for determining whether to attenuate the processing of packets. The process may be performed by processing logic that may comprise hardware (circuitry, dedicated logic, etc.), software (such as is run on a general purpose computer system or a dedicated machine), or a combination of both.

Referring to FIG. 4, the process begins with processing logic determining whether the packet belongs to a known flow (processing block 401). In one embodiment, this is performed by processing logic looking up the flow in a lookup table that is indexed based on the flow ID.

If the packet does belong to a known flow, processing logic determines whether the packet is a "DoneFlow" indicating one side of the conversation is closing the TCP connection (processing block 402). If so, processing logic decrements the flow count and cleans up the conversation (processing block 403) and then the process transitions to processing block 412. In one embodiment, cleaning up the conversation includes releasing memory back to the system, decrementing counters, etc. in order to reclaim the resources the system allocated in order to process and analyze the conversation. If the packet is not a DoneFlow, processing logic transitions to processing block 412.

If processing logic determines that the packet does not belong to a known flow, processing logic classifies the packet (processing block 404), computes a 16-bit conversation CRC (processing block 405), and tests whether the flow belongs to an existing conversation (processing block 406).

If processing logic determines the flow does not belong to an existing conversation, processing logic inserts the new conversation into a map (processing block 407) and processing logic determines whether the conversation should be attenuated (processing block 408). The map is a software container used to manage the collection of conversations that are processed. Note that other mechanisms known in the art may be used to track and manage the conversations. If processing logic determines the conversation should be attenuated, processing logic creates a new flow, stores the conversation CRC for future use in identifying packets for existing conversations, creates key properties, and stores an analyze/attenuate decision (processing block 410), adds the flow to the flow map (processing block 411), and transitions to processing block 412. Key properties are attributes of a packet that can uniquely identify it as part of a conversation. In one embodiment, one key property is a CRC based on the client/server IP address and protocol. The analyze/attenuate decision is meta-data about a conversation indicating whether or not the conversation is attenuated. By maintaining this data, the system quickly determines if future traffic should be attenuated or not by determining if it is part of a conversation of which the system is already aware and then checking the "analyze/attenuate" decision metadata. If processing logic determines that the conversation should not be attenuated, processing logic creates a new flow, stores the conversation CRC for future use in identifying packets for existing conversations, and stores an analyze/attenuate decision (processing block 409) and thereafter transitions to processing block 411.

At processing block 412, processing logic determines whether the conversation is currently flagged for attenuation based on the processing that occurred in processing block 408. If processing logic determines that the conversation should be attenuated, processing logic tests whether the monitoring system is in the SASOUT state (processing block 416). In one embodiment, the monitoring system is in the SASOUT state when the buffers are at or below 10% FDR and at most 10% of all conversations (new or existing) are to be attenuated. If processing logic determines the current state is the SASOUT state, processing logic checks if the conversation should be attenuated (processing block 417). In one embodiment, this processing is part of the performance manager's operation. The performance manager monitors the input buffer's fill/drain rate ratio and determines the level of attenuation that is required at the current time. When the conversation was initially processed in processing blocks 408-410 the conversation was marked as a candidate for attenuation or not. If the conversation is marked for attenuation, processing logic switches the conversation's attenuation state so that packets in the conversation will start to undergo full analysis (processing block 419), marks the packet for full analysis (processing block 420), and transitions to processing block 421. In one embodiment, full analysis means layer 4 analysis, layer 7 analysis and network performance analysis. In other words, since the system load is low and there isn't a need to attenuate traffic (e.g., the system is in the SASOUT state). The system can analyze a conversation that was previously marked for attenuation. Thus, when the state of the conversation is switched and undergoes analysis thereafter, the net effect is that new flows will be created in downstream analysis and the existing extended packet-byte analyzer statistics will be injected in the normal fashion.

If the state of the monitoring system is not the SASOUT state, the process transitions to processing block 418 where the packet is marked for attenuation and the process transitions to processing block 421.

If processing logic at processing block 412 determines that the conversation is not currently marked for attenuation, the process determines whether the state of the monitoring system is in the SASIN state (processing block 413). In one embodiment, the monitoring system is in the SASIN state when at least 70% FDR exists, and if that is the case at least 70% of all conversations (new or existing) are to be attenuated.

If the monitoring system is not in the SASIN state, the process transitions to processing block 420, where processing logic marks the packet for full analysis. If the monitoring system is in the SASIN state, the process transitions to processing block 414 where processing logic determines whether the conversation should be attenuated. If processing logic determines that the conversation should not be attenuated, the process transitions to processing block 420 where the packet is marked for full analysis. If processing logic determines the conversation is to be attenuated, the process transitions to processing block 415 where the attenuation state of the conversation is switched so that packets in the conversation will start to be attenuated. In one embodiment, when the state of the conversation is switched to attenuate, the net effect is that the flow in the downstream analysis needs to be finalized (e.g., release the resources allocated to fully analyze the conversation). In one embodiment, this is done by changing a flag for the packet, referred to herein as flowStatus_Done, to true and sending the packet for downstream analysis so that the proper cleanup (e.g., release the resources allocated to fully analyze the conversation) can occur. Since the conversation is attenuated at this point, subsequent packets will be sent to an extended packet-byte analyzer. In one embodiment, in the case where a packet does not undergo full analysis and gets sent to the extended packet-byte analyzer for analysis, the system still performs some minimal analysis, such as keeping track of the packet and byte counts of the attenuated traffic.

After switching the attenuation state of the conversation, the process transitions to processing block 421.

At processing block 421, processing logic determines whether to attenuate the packet. If not, processing logic sends the packet to downstream analysis (processing block 423). If processing logic determines that the packet is to be attenuated, processing logic sends the packet to the extended packet-byte analyzer (processing block 422).

An Example of a Monitoring/Analysis Device

FIG. 5 is one embodiment of a block diagram of a network monitoring device. Referring to FIG. 5, the network monitoring device may include network interfaces 520 that attach the device to a network via multiple ports, one or more processors 530 for performing monitoring and analysis described above, memory (e.g., RAM, ROM, databases, etc.) 524, display 528, user input devices 530 (e.g., keyboard, mouse or other pointing devices, touch screen, etc.). Packet processing module 525 is stored in memory 524 and may be executed by processors 523 to provide processing of packets and storage of data related thereto for use in the monitoring device to assist in packet processing and analysis related to client/server traffic. In one embodiment, packet processing module 525 includes an attenuation module 525A that dynamically scales the amount of packet processing that is performed to adjust the completeness of the application performance analysis, i.e., how complete the application performance analysis is.

In one embodiment, the monitoring device is attached to the network and observes transmissions on the network to collect information and statistics thereon related to client/server traffic. The network monitoring device uses a set of filters that operate based on detecting TCP traffic only in order to collect only information that is relevant to client/server traffic. Such IP address ranges or ports may be set by the network monitoring device using a user interface.

In the previous description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use with a network application performance monitoring system, the method comprising: monitoring incoming network traffic and a rate at which the traffic is being analyzed using an analysis process; and dynamically adjusting, in response to monitoring the incoming network traffic and the rate at which the traffic is being analyzed including layer 7 application analysis, layer 4 application analysis and network performance level analysis, a selected parameter of the monitoring process to adjust application performance analysis completeness, the analysis being performed on the observed network traffic wherein dynamically adjusting application performance analysis completeness comprises:
    computing an amount of time that analysis by the application performance monitoring system can continue without dropping incoming packets;
    comparing the amount of time to a first threshold; and
    adjusting completeness of application performance analysis based on results of comparing the amount of time to the first threshold including eliminating a subset of the following analyses: network performance level analysis, layer 4 application analysis, and layer 7 application analysis.

2. The method of claim 1 wherein adjusting the completeness of the application performance analysis comprises: determining that the amount of time is below the first threshold; and decreasing the completeness of the application performance analysis.

3. The method of claim 2 wherein decreasing the completeness of the application performance analysis is only performed with respect to the non-critical applications.

4. The method of claim 3 further comprising: subsequently reevaluating the amount of time to the first threshold; and changing the completeness of the application performance analysis of one or more critical applications if the amount of time is still below the first threshold.

5. The method of claim 2 further comprising increasing application performance analysis completeness if the monitoring system is running under maximum capacity and is not performing all levels of application performance analysis.

6. The method of claim 1 wherein decreasing application performance analysis completeness comprises performing only network performance level analysis.

7. The method of claim 1 wherein decreasing application performance analysis comprises performing only network performance level analysis and layer 4 application analysis.

8. An article of manufacture having one or more non-transitory storage media storing instructions therein which, when executed by a system, causes the system to perform a method for use with a network application performance monitoring system, the method comprising: monitoring incoming network traffic and a rate at which the traffic is being analyzed using an analysis process; and dynamically adjusting, in response to monitoring the incoming network traffic and the rate at which the traffic is being analyzed including layer 7 application analysis, layer 4 application analysis and network performance level analysis, a selected parameter of the monitoring process to adjust application performance analysis completeness, the analysis being performed on the observed network traffic wherein dynamically adjusting application performance analysis completeness comprises:

computing an amount of time that analysis by the application performance monitoring system can continue without dropping incoming packets;

comparing the amount of time to a first threshold; and adjusting completeness of application performance analysis based on results of comparing the amount of time to the first threshold including eliminating a subset of the following analyses: network performance level analysis, layer 4 application analysis, and layer 7 application analysis.

9. The article of manufacture defined in claim 8 wherein adjusting the completeness of the application performance analysis comprises: determining that the amount of time is below the first threshold; and decreasing the completeness of the application performance analysis.

10. The article of manufacture defined in claim 9 wherein decreasing the completeness of the application performance analysis is only performed with respect to the non-critical applications.

11. The article of manufacture defined in claim 10 wherein the method further comprises: subsequently reevaluating the amount of time to the first threshold; and changing the completeness of the application performance analysis of one or more critical applications if the amount of time is still below the first threshold.

12. The article of manufacture defined in claim 9 wherein the method further comprises increasing application performance analysis completeness if the monitoring system is running under maximum capacity and is not performing all levels of application performance analysis.

13. The article of manufacture defined in claim 8 wherein decreasing application performance analysis completeness comprises performing only network performance level analysis.

14. The article of manufacture defined in claim 8 wherein decreasing application performance analysis comprises performing only network performance level analysis and layer 4 application analysis.

15. A system for use in monitoring network application performance, the system comprising: a memory to store a network application performance analysis module; and a processor coupled to the memory to execute the network application performance analysis module to: monitor incoming network traffic and a rate at which the traffic is being analyzed using an analysis process; and dynamically adjust, in response to monitoring the incoming network traffic and the rate at which the traffic is being analyzed including layer 7 application analysis, layer 4 application analysis and network performance level analysis, a selected parameter of the monitoring process to adjust application performance analysis completeness, the analysis being performed on the observed network traffic wherein dynamically adjusting application performance analysis completeness comprises:

computing an amount of time that analysis by the application performance monitoring system can continue without dropping incoming packets;

comparing the amount of time to a first threshold; and adjusting completeness of application performance analysis based on results of comparing the amount of time to the first threshold including eliminating a subset of the following analyses: network performance level analysis, layer 4 application analysis, and layer 7 application analysis.

16. The system defined in claim 15 wherein the processor is operable to: compute an amount of time that analysis by the application performance monitoring system can continue without dropping incoming packets; compare the amount of time to a first threshold; and adjust completeness of application performance analysis based on results of comparing the amount of time to the first threshold.

\* \* \* \* \*